(12) United States Patent
Tan

(10) Patent No.: US 7,634,024 B2
(45) Date of Patent: Dec. 15, 2009

(54) ADAPTIVE PEAK WINDOWING FOR CREST FACTOR REDUCTION IN A COMMUNICATION SYSTEM TRANSMITTER

(75) Inventor: Mizhou Tan, Whitehall, PA (US)

(73) Assignee: Agere Systems Inc., Allentown, PA (US)

( * ) Notice: Subject to any disclaimer, the term of this patent is extended or adjusted under 35 U.S.C. 154(b) by 768 days.

(21) Appl. No.: 11/047,387

(22) Filed: Jan. 31, 2005

(65) Prior Publication Data

US 2006/0171486 A1    Aug. 3, 2006

(51) Int. Cl.
  *H04K 1/02* (2006.01)
(52) U.S. Cl. .................... 375/297; 375/260; 375/262; 375/267; 375/296; 375/284; 370/208; 370/252; 370/350; 370/522; 455/126; 455/450; 455/522; 709/248; 714/712; 714/746
(58) Field of Classification Search .................. 375/297
  See application file for complete search history.

(56) References Cited

U.S. PATENT DOCUMENTS

| | | | |
|---|---|---|---|
| 6,741,661 B2* | 5/2004 | Wheatley et al. ............ 375/296 |
| 7,013,161 B2* | 3/2006 | Morris .......................... 455/522 |
| 7,336,724 B2* | 2/2008 | Jaenecke et al. ............. 375/296 |
| 7,362,819 B2* | 4/2008 | Obernosterer et al. ........ 375/296 |
| 7,382,835 B2* | 6/2008 | Anvari .......................... 375/297 |
| 2004/0052314 A1* | 3/2004 | Copeland ...................... 375/296 |

OTHER PUBLICATIONS

O. Vaananen et al., "Effect of Clipping in Wideband CDMA System and Simple Algorithm for Peak Windowing," World Wireless Congress, pp. 614-619, 2001.

* cited by examiner

*Primary Examiner*—Shuwang Liu
*Assistant Examiner*—Dhaval Patel
(74) *Attorney, Agent, or Firm*—Ryan, Mason & Lewis, LLP

(57) ABSTRACT

In a communication system transmitter, a baseband processor is configured for coupling via an upconverter to an input of a power amplifier of the transmitter. The baseband processor comprises a crest factor reduction element implementing an adaptive peak windowing algorithm for application to an input signal, the adaptive peak windowing algorithm comprising a function that is adaptively adjustable for reducing interference among different peaks of the input signal.

20 Claims, 4 Drawing Sheets

100: ORIGINAL PEAK
102: WITHOUT CORRECTION
104: WITH CORRECTION

ADAPTIVE PEAK WINDOWING FOR CREST FACTOR REDUCTION IN A COMMUNICATION SYSTEM TRANSMITTER

FIELD OF THE INVENTION

The present invention relates generally to communication systems, and more particularly to wireless base station transmitters or other types of communication system transmitters which incorporate one or more power amplifiers.

BACKGROUND OF THE INVENTION

The crest factor of a modulated signal is generally defined as the ratio of its peak power to its average power. Constant envelope modulation techniques such as frequency modulation (FM) and Gaussian minimum shift keying (GMSK) have a low crest factor. Therefore, in conventional communication systems, these techniques have been employed to allow a transmitter power amplifier to operate in its non-linear range near saturation, resulting in high power efficiency. However, these modulation techniques exhibit low spectral efficiency.

The introduction of third generation (3G) code division multiple access (CDMA) systems such as wideband CDMA (WCDMA) and CDMA2000 has driven the need for high spectral efficiency modulation schemes such as phase shift keying (PSK) and quadrature amplitude modulation (QAM), capable of handling the increased volume of mobile users. In 3G base stations, after PSK or QAM modulation, signals associated with multiple carriers are combined into a single wideband signal which is then amplified by a multi-carrier power amplifier. Due to the high crest factor caused by the use of spectrally efficient modulation techniques and multi-carrier combining, the wideband signals are subject to severe in-band and out-of-band distortion when the multi-carrier power amplifiers are operated outside their linear range. Typically, to avoid such nonlinearity, the output power of the multi-carrier power amplifier must be reduced or "backed off," resulting in very low power efficiency.

It is well known that the efficiency of the multi-carrier power amplifiers is an important determinant in the cost of 3G base stations. Thus, when the crest factor increases, the cost of the base stations also increases. Cost is increased because the low power efficiency of the power amplifier may require higher power consumption in order to achieve a desired coverage level in the system. Accordingly, crest factor reduction (CFR) has become a very important task in the design of 3G base stations.

Crest factor reduction is generally a baseband signal processing technique, which aims to reduce the dynamic range of a signal prior to power amplification. It is usually combined with another power amplifier linearization technique, such as digital pre-distortion (DPD), in order to achieve the best power amplifier efficiency.

A number of crest factor reduction techniques are known in the art. These include peak clipping and peak windowing. As indicated above, these techniques are applied to baseband signals prior to power amplification. For example, such techniques may be applied in a baseband signal processor of a base station transmitter in a WCDMA or CDMA2000 cellular system.

Conventional peak clipping of an input signal $x(n)$ to generate a clipped signal $y(n)$ can be expressed as the following multiplication:

$$y(n) = c(n)x(n),$$

where $$c(n) = \begin{cases} 1 & |x(n)| \leq A \\ \dfrac{A}{|x(n)|} & |x(n)| > A \end{cases}$$

denotes the clipping factor for the nth sample $x(n)$ of the input signal, and A is the maximum amplitude of the clipped signal $y(n)$. The clipping ratio is given by $A/\sigma$, where $\sigma$ is the standard variance of the input signal $x(n)$ before clipping. Unfortunately, conventional clipping techniques can cause sharp corners in the clipped signal and thereby significantly degrade the adjacent channel leakage ratio (ACLR). Typically, a complex long-tap filter with sharp transition characteristics is required for filtering subsequent to the clipping process. Furthermore, peak re-growth after filtering typically limits the reduction in crest factor that is achievable with a peak clipping approach.

In general, the peak windowing approach involves multiplying the signal to be clipped, $x(n)$ in the example above, with a windowing function. This allows the sharp corners to be smoothed, improving the ACLR. However, conventional peak windowing is disadvantageous in that it can produce a high error vector magnitude (EVM), which is primarily caused by over-clipping the signal in the presence of frequent peaks. The 3G WCDMA specifications call for an upper bound of 17.5% EVM, which limits the effectiveness of conventional peak windowing in terms of its ability to reduce crest factor.

Accordingly, what is needed is an improved peak windowing approach which can provide a substantial reduction in crest factor without unduly increasing EVM.

SUMMARY OF THE INVENTION

The present invention provides improved techniques for crest factor reduction that overcome one or more of the drawbacks of conventional practice as described above.

In accordance with one aspect of the invention, a baseband processor in a communication system transmitter is configured for coupling via an upconverter to an input of a power amplifier of the transmitter. The baseband processor comprises a crest factor reduction element implementing an adaptive peak windowing algorithm for application to an input signal, the adaptive peak windowing algorithm comprising a function that is adaptively adjustable for reducing interference among different peaks of the input signal.

In an illustrative embodiment, the adaptive peak windowing multiplies the input signal with the following function, which comprises a predefined windowing function $w(n)$:

$$b(n) = 1 - \sum_{k=-\infty}^{\infty} \delta \cdot [1 - c'(k)]w(n-k),$$

where $\delta$ denotes a scaling factor and $c'(k)$ denotes a modification of a kth clipping factor $c(k)$ of the input signal. Preferably, both the scaling factor $\delta$ and the modified clipping factor $c'(k)$ change adaptively based on information associated with one or more peaks of the input signal observed within a current window.

In conjunction with arrival of a first peak in the input signal, the adaptive peak windowing algorithm updates the scaling factor and utilizes the updated scaling factor to scale the windowing function. If a given peak does not end, the corresponding scaling factor continues to be applied in calculating b(n). Once such a peak ends and in conjunction with arrival of a complete new peak, the adaptive peak windowing algorithm again updates the scaling factor and utilizes the updated scaling factor to scale the windowing function.

The scaling factor may be updated in the following manner. After a complete peak pulse of the input signal is observed in the current window, a corresponding sequence of c(k) samples is saved as a vector P, where P is processed to generate a vector $\tilde{C}$ which corresponds to the vector P prefixed and suffixed with 1 values until its length is the same as the length of the current window and the minimum value of P is positioned in the center of the current window. The vectors P and $\tilde{C}$ are then utilized to update the scaling factor $\delta$, using the following equation:

$$\delta = \frac{1 - \min(P)}{(1 - \tilde{C}) * W^T}.$$

Similarly, the modified sample c'(k) may be determined as an entry of a vector C' which corresponds to the vector P prefixed with 1 values and suffixed with a single 1 value until its length is the same as the length of the current window. The vector C' may be utilized in computing a new function b(n).

The crest factor reduction element may be implemented at least in part in software running on the baseband processor. The baseband processor itself may be implemented as one or more integrated circuits.

In the illustrative embodiment, the baseband processor further comprises a multi-carrier combining element and a digital pre-distortion element, with the crest factor reduction element is coupled between an output of the multi-carrier combining element and an input of the pre-distortion element. Numerous other arrangements are possible.

Advantageously, the adaptive peak windowing algorithm in the illustrative embodiment provides significantly better EVM than conventional peak windowing algorithms, particularly when the clipping level is low. Also, compared with a peak clipping before filtering approach, the ACLR improvement is significant. Moreover, the adaptive peak windowing algorithm of the illustrative embodiment is not sensitive to factors such as window length and peak pulse shape.

DETAILED DESCRIPTION OF THE INVENTION

Figure 1:
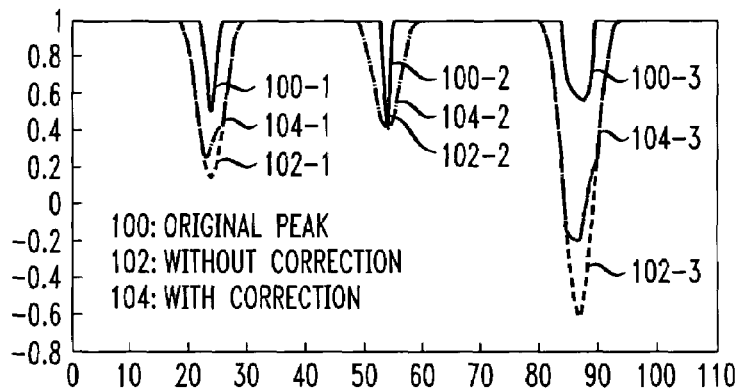
FIG. 1 is a plot showing a number of original peaks, with corresponding uncorrected windowed peaks and corrected windowed peaks as generated using a conventional peak windowing algorithm.

The invention will be described herein in conjunction with an illustrative embodiment of a communication system transmitter configured with adaptive peak windowing. It should be understood, however, that the invention is more generally applicable to any communication system transmitter in which it is desirable to provide a reduction in crest factor. For example, the described techniques, although particularly well suited for use in 3G WCDMA or CDMA2000 base station transmitters, can be adapted in a straightforward manner to other types of communication system transmission applications.

The present invention in the illustrative embodiment provides an improved peak windowing approach referred to herein as "adaptive peak windowing." More specifically, the illustrative embodiment, by analyzing incoming peak pulse information within a current window, adaptively updates a scaling factor of a windowing function. This advantageously eliminates interference among different peak pulses, resulting in a lower EVM.

Compared with conventional peak clipping, the adaptive peak windowing of the illustrative embodiment improves the ACLR significantly by multiplying the input signal with a properly selected windowing function having good spectral properties. Moreover, by adaptively adjusting the scaling factor of the windowing function and eliminating the interference among different peaks of the input signal, the lower EVM is achieved with a computational complexity comparable to that of conventional peak windowing techniques. Therefore, it presents a good compromise between ACLR and EVM and is very promising for practical application, for example, in 3G WCDMA or CDMA2000 base station transmitters.

As mentioned previously, the conventional peak windowing approach involves multiplying a signal to be clipped, denoted x(n) in the peak clipping example above, with a function b(n) which comprises a windowing function w(n). In one implementation, a peak windowing approach may replace c(n) in the peak clipping example with the following function:

$$b(n) = 1 - \sum_{k=-\infty}^{\infty} a_k w(n-k),$$

where w(n) is the windowing function and $a_k$ is a weighting coefficient. In practice, a finite window length should be chosen, representing the number of samples of w(n) which are not equal to zero. If the clipping probability and window length are low, so that windows do not overlap in the time domain, the function b(n) may be replaced with:

$$b(n) = 1 - \sum_{k=-\infty}^{\infty} [1 - c(k)]w(n-k),$$

where c(n) denotes an nth clipping factor. However, with a decrease of the clipping ratio A/σ, the peaks will happen more frequently and the windows will overlap. In such a case, over-clipping will occur, which causes high EVM. In some cases, b(n) might become negative, which is typically fatal to the system.

One known technique for dealing with such over-clipping is to scale down the signal to be clipped with a feedback structure, as described in O. Vaananen et al., "Effect of clipping in wideband CDMA systems and simple algorithm for peak windowing," pp. 614-619, World Wireless Congress, San Francisco, 2001, which is incorporated by reference herein. However, the correction capability is limited in most cases.

FIG. 1 shows a plot depicting three original peaks 100-1, 100-2 and 100-3, represented by multiple clipping factors c(n). Also shown are uncorrected windowed peaks 102-1, 102-2 and 102-3, represented by multiple samples b(n) as given by the above equation, and corrected windowed peaks 104-1, 104-2 and 104-3, obtained using the peak windowing algorithm described in the above-cited O. Vaananen et al. reference.

It should noted that the peaks shown in FIG. 1, and in other similar plots herein, are not true peaks in the input signal x(n). Instead, they can be regarded as a transformed representation of the input signal peaks. In this representation, c(n) is used to show the information of the peak, since c(n)=1 if the signal sample is smaller than the threshold A, and c(n)<1 if the signal sample is larger than A. Therefore, we can use c(n) to represent the actual signal peaks, which means the signal samples greater than the threshold. Since 0<c(n)<1, the peaks appear upside down in the figure. The smaller the c(n), the larger the signal samples. For the same reason, b(n) can also be used to represent the peaks after the peak windowing process. The clipping factor c(n) will not become negative, but b(n) will if over-clipping occurs. In FIG. 1, it can be seen that the conventional peak windowing could result in a negative b(n), which will be fatal to the system. But in FIGS. 3, 4 and 5, to be described below, this will not happen, since over-clipping has been effectively corrected by the adaptive peak windowing algorithm.

The term "peak" as used herein is intended to be construed generally, and should be understood to include without limitation a signal peak or other type of peak, such as a peak in a transformed representation as described above, or as shown in the plots of FIGS. 1, 3, 4 and 5. Such transformed representation peaks are considered a type of input signal peak herein.

Also, the term "input signal" should be understood to include, by way of example and without limitation, a signal applied to an input of a crest factor reduction element. The invention can be applied to other types of input signals, and the term may be more generally construed as referring a signal to which an adaptive peak windowing algorithm is applied.

From FIG. 1, it is clear that the conventional peak windowing algorithm works well when the peak is narrow, but otherwise the over-clipping cannot be corrected effectively. Furthermore, this algorithm is sensitive to the choice of the window length, since different peaks residing in the same window can interfere with each other.

The adaptive peak windowing approach of the illustrative embodiment overcomes these and other problems associated with conventional peak windowing. In this embodiment, the function b(n) is modified as follows:

$$b(n) = 1 - \sum_{k=-\infty}^{\infty} \delta \cdot [1 - c'(k)]w(n-k),$$

where δ is a scaling factor and c'(k) is a modification of c(k). As will be described below, both δ and c'(k) change adaptively based on information associated with incoming peaks observed within a current window.

Figure 2:
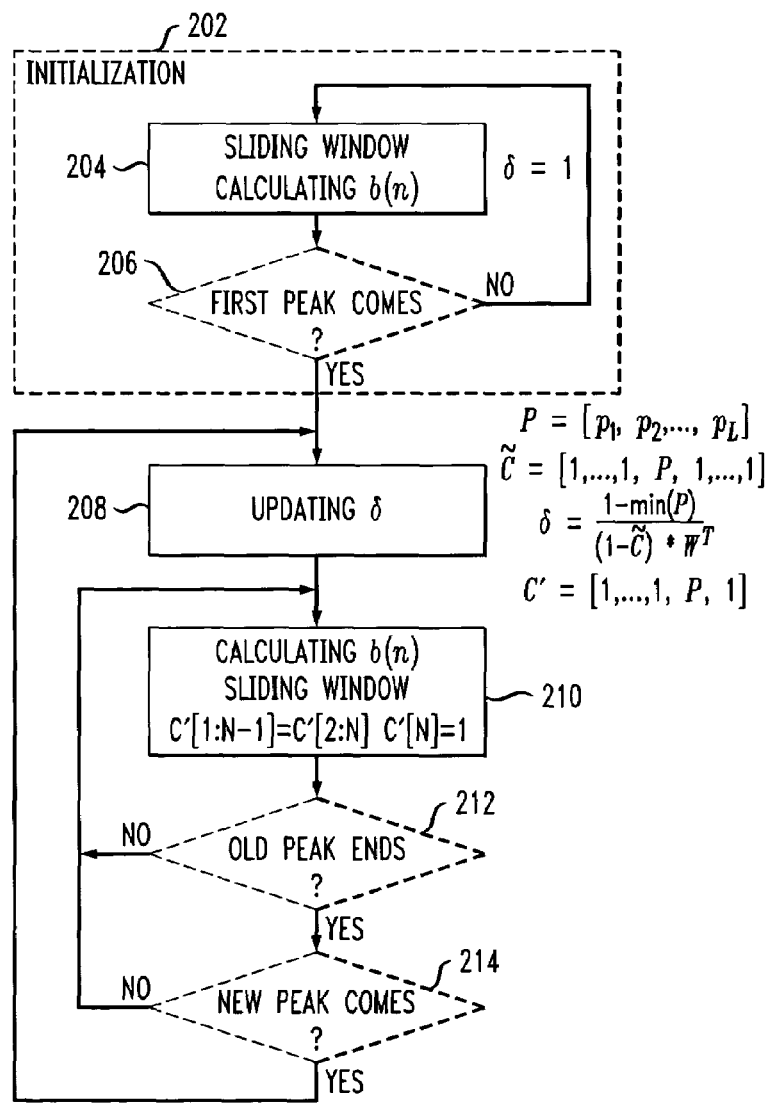
FIG. 2 is a flow diagram showing the operation of an adaptive peak windowing algorithm in an illustrative embodiment of the invention.

FIG. 2 shows the operation of an adaptive peak windowing algorithm 200 utilizing the modified b(n) function given above. The algorithm 200 includes an initialization phase 202, with steps 204 and 206. Step 204 is an initial sliding window computation, involving calculating b(n) for a scaling factor of δ=1. Step 206 determines if a first peak has arrived. If not, the process returns to step 204. Otherwise, the process moves to step 208, to update the scaling factor δ and to update other variables as shown, where N denotes the window length. Step 210 then determines a new sliding window by calculating b(n). Steps 212 and 214 determine if the "old peak" has ended and a "new peak" has arrived, respectively. A negative answer to either determination results in the process returning to step 210. An affirmative answer to the determination in step 212 results in the process moving to step 214, where another affirmative determination results in the process returning to step 208 for another update of the scaling factor δ.

The updating of the scaling factor in the illustrative embodiment proceeds in accordance with the following equation:

$$\delta = \frac{1 - \min(P)}{(1 - \tilde{C}) * W^T},$$

wherein P and $\tilde{C}$ are vectors to be described below, and W is a row vector including windowing function coefficients which when transposed becomes a column vector. In the denominator, the product of row vector $(1-\tilde{C})$ and column vector $W^T$ is a scalar.

It is assumed in this embodiment that the window length is much larger than the peak pulse length, although this and other assumptions made herein for purposes of illustrative description should not be construed as limitations of the invention.

In operation, the adaptive peak windowing algorithm 200 of FIG. 2 makes a decision on the next incoming peak information based on the available signal within the current window. First, with the sliding of the window, c(k) is calculated. Once a new complete peak pulse is observed, the corresponding sequence of c(k) is saved as the vector P. Then, P is prefixed and suffixed with 1 to become the length of the window and the minimum value of P is positioned in the center of the window, yielding the vector $\tilde{C}$. The scaling factor δ is calculated in step 208 using the equation shown above and c(k) is modified to be c'(k). Notice that to eliminate the effects of other peaks positioned in the same window, the rest of the values in vector C' are set to one. Also, C' should be synchronized with the original input signal. Updating δ in step 208 lets the window fit more closely to the shape of the peak pulse and the modification of c(k) eliminates the undesirable effect of other peaks imposed on the current peak.

Figure 3:
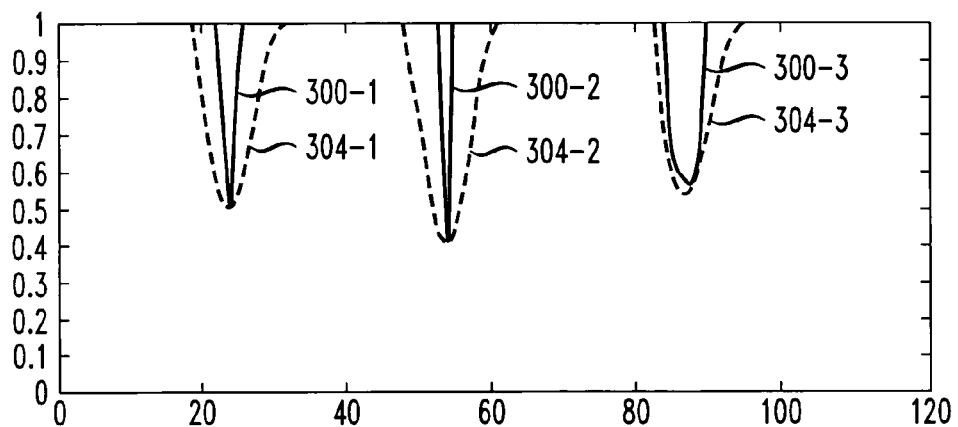
FIGS. 3, 4 and 5 are plots illustrating the operation of the adaptive peak windowing algorithm of FIG. 2 for different window lengths and pulse shapes.
Figure 4:
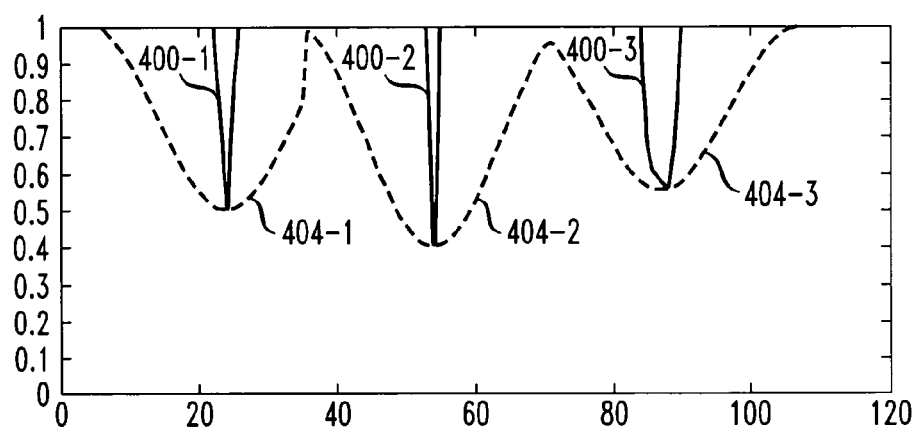
Figure 5:
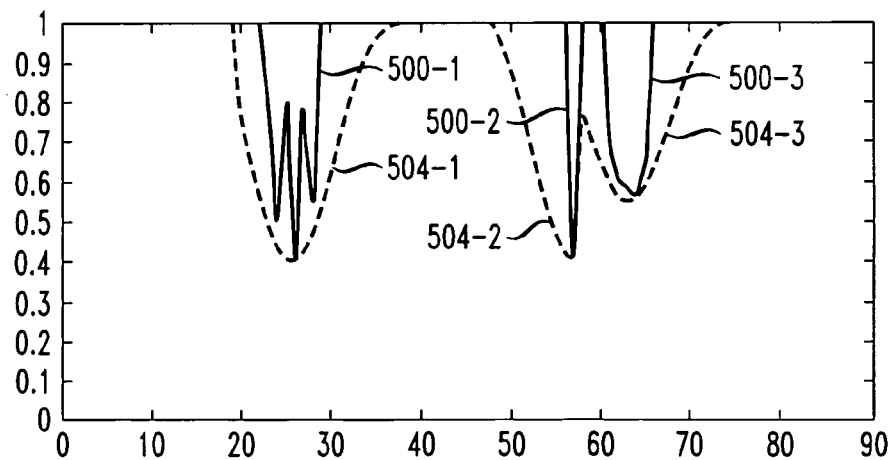

FIGS. 3, 4 and 5 are plots illustrating the operation of the adaptive peak windowing algorithm of FIG. 2 for different window lengths and pulse shapes. These figures show original peaks represented by c(n) and the corresponding corrected windowed peaks represented by b(n) as obtained using the adaptive peak windowing algorithm of FIG. 2. As will become apparent, these figures show that the algorithm is effective in eliminating over-clipping in a variety of different situations, thereby providing a lower EVM.

With regard to FIG. 3, adaptive peak windowing with a small window length is shown. The original peaks are given by 300-1, 300-2 and 300-3, and the corresponding adaptively windowed peaks by 304-1, 304-2 and 304-3, respectively.

In FIG. 4, adaptive peak windowing with a large window length is shown. The original peaks are given by 400-1, 400-2 and 400-3, and the corresponding adaptively windowed peaks by 404-1, 404-2 and 404-3, respectively.

FIGS. 3 and 4 indicate that the pulse widths of the original peaks are approximately 5, 2 and 8. For FIG. 3, the window length is about 10, while for FIG. 4, the window length is about 30. The particular numbers used in these and other examples herein are for illustrative purposes only, and should not be construed as requirements of the invention.

Finally, in FIG. 5, adaptive peak windowing with different pulse shapes is shown. The original peaks are given by 500-1, 500-2 and 500-3, and the corresponding adaptively windowed peaks by 504-1, 504-2 and 504-3, respectively.

From these plots, it is apparent that the adaptive peak windowing algorithm of the illustrative embodiment is not sensitive to the window length. In addition, it can adapt the window with different shapes of the peak and correct overclipping effectively. As a result, it provides a significantly lower EVM than conventional peak windowing techniques.

Additional advantages of the illustrative embodiment are apparent from simulation results summarized in Tables 1, 2 and 3 below. These tables show performance comparisons of three crest factor reduction techniques at three different clipping ratios. The three techniques are conventional peak clipping, conventional peak windowing using the algorithm described in the above-cited O. Vaananen et al. reference, and adaptive peak windowing using the algorithm of the illustrative embodiment. The peak clipping is before filtering. A WCDMA 4-carrier signal is obtained using Test Mode 1, comprising 16 downlink packet channels (16DPCH). A Hanning window with a length of 70 is employed for the simulations. The EVM results are obtained by averaging over 4 slots. It should be noted that the 3G WCDMA specifications call for values of ACLR>45 dB and EVM<17.5%.

Test Model 1 is one of the test models provided by the WCDMA system test specification. It provides a "real" WCDMA signal source appropriate for ACLR and EVM tests. In this test model, different DPCH configurations can be selected, such as DPCH16, DPCH32 and DPCH64. Although DPCH16 is used for the simulations below, this is not a special case. It is expected that similar results would be obtained for other parameters and other test models, since the signal envelope will become Rayleigh distributed once a larger number of channels are combined.

TABLE 1

Performance comparison for clipping ratio A/σ = 2.37.

| Algorithm | Crest Factor (0.01%) (dB) | EVM (%) | ACLR (dB) |
|---|---|---|---|
| Peak Clipping | 7.5 | 1.467 | 42 |
| Peak Windowing | 7.5 | 5.039 | 55 |
| Adaptive Peak Windowing | 7.5 | 3.981 | 55 |

TABLE 2

Performance comparison for clipping ratio A/σ = 2.11.

| Algorithm | Crest Factor (0.01%) (dB) | EVM (%) | ACLR (dB) |
|---|---|---|---|
| Peak Clipping | 6.5 | 2.7625 | 32 |
| Peak Windowing | 6.5 | 10.966 | 46 |
| Adaptive Peak Windowing | 6.5 | 6.46075 | 46 |

TABLE 3

Performance comparison for clipping ratio A/σ = 1.778.

| Algorithm | Crest Factor (0.01%) (dB) | EVM (%) | ACLR (dB) |
|---|---|---|---|
| Peak Clipping | 5 | 5.6673 | 27 |
| Peak Windowing | 5 | 28.681 | 35 |
| Adaptive Peak Windowing | 5 | 9.407 | 35 |

From the simulation results, it is clear that the adaptive peak windowing algorithm in the illustrative embodiment provides significantly better EVM than the conventional peak windowing algorithm, particularly when the clipping level is low. And compared with the peak clipping before filtering approach, the ACLR improvement is significant.

It should be noted that when the clipping ratio is very low, filtering might also be needed for the adaptive peak windowing algorithm. However, the complexity of such post CFR filtering is much lower than that required for the peak clipping approach.

The adaptive peak windowing algorithm in the illustrative embodiment achieves a good compromise between ACLR and EVM, and thus it is more attractive than the conventional peak clipping and peak windowing techniques, particularly in 3G applications such as WCDMA and CDMA2000. Moreover, its complexity is moderate, since slight additional computations are required for making decisions and updating the scaling factor. Its delay is half the window length, which is the same as that of the typical conventional peak windowing algorithm.

The FIG. 2 peak windowing algorithm can be implemented in software in a baseband processor of a wireless base station transmitter or other communication system transmitter.

Figure 6:
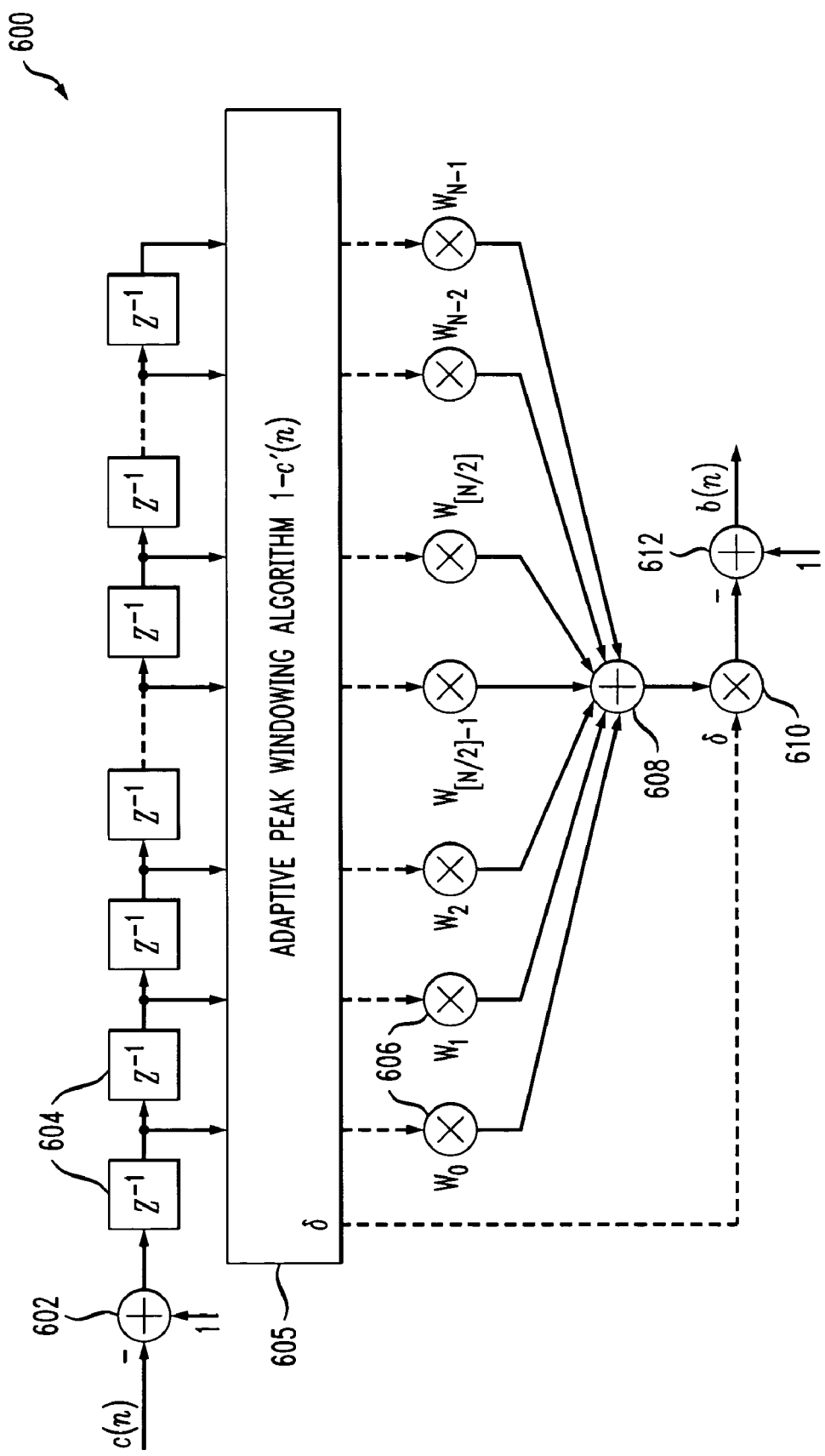
FIG. 6 is a block diagram showing one possible implementation of the adaptive peak windowing algorithm of FIG. 2.

FIG. 6 shows one possible implementation of a portion of a baseband processor 600 which implements the adaptive peak windowing algorithm 200 of FIG. 2. In this example implementation, the adaptive peak windowing is performed using a finite impulse response (FIR) filter configuration comprising summation elements 602, 608 and 612, delay elements 604, computation element 605, and multipliers 606 and 610, arranged as shown. These elements collectively process input samples c(n) in order to generate corrected windowed samples by b(n) in accordance with the previously-described equation:

$$b(n) = 1 - \sum_{k=-\infty}^{\infty} \delta \cdot [1 - c'(k)] w(n-k).$$

The computation element 605 computes the updates of δ and c'(n) through the adaptive algorithm as mentioned above. This element, as well as the other elements of the processor 600, can be implemented at least in part in the form of software.

Figure 7:
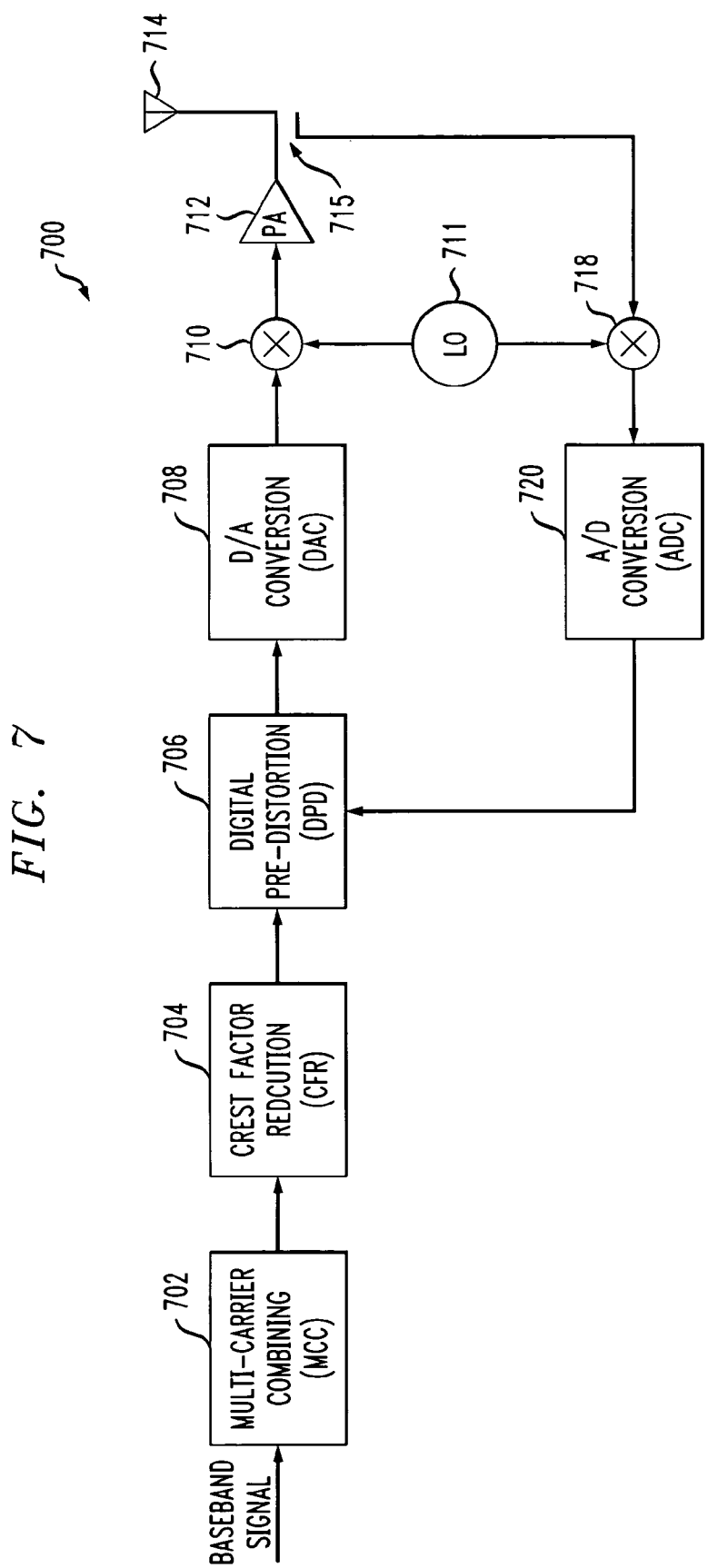
FIG. 7 is a block diagram of a communication system transmitter which implements an adaptive peak windowing algorithm in accordance with the invention.

FIG. 7 shows an example of a transmitter 700 which implements an adaptive peak windowing algorithm in accordance with the invention. The transmitter 700 may be, for example, a WCDMA or CDMA2000 base station transmitter. The system 700 comprises a multi-carrier combining (MCC) element 702, a crest factor reduction (CFR) element 704, and a digital pre-distortion (DPD) element 706. The digital output of the DPD element is converted to analog in digital-to-analog converter (DAC) 708, and then upconverted to radio frequency (RF) in mixer 710 using a local oscillator (LO) 711. The upconverted signal is then amplified in power amplifier (PA) 712, and the amplified signal is applied to an antenna 714 for transmission.

A coupler 715 couples a portion of the amplified output signal back to the DPD element 706, via downconverter 718 and analog-to-digital converter 720, for use in implementing the pre-distortion technique. Such techniques are well understood in the art, and not described in detail herein.

The CFR element 704 implements the adaptive peak windowing algorithm of FIG. 2, using the FIR configuration of FIG. 6 or another suitable implementation of the algorithm. The CFR element 704 limits the peak-to-average power ratio of its digital input signal subsequent to the combining operation performed in MCC element 702.

Elements 702, 704, 706, 708 and 720 of transmitter 700, or a subset thereof, possibly in combination with separate memory circuitry or other elements, may be viewed as representing a type of baseband processor in accordance with the invention. The term "baseband processor" as used herein, however, is intended to be construed broadly so as to encompass any arrangement of elements suitable for implementing at least a portion of a crest factor reduction technique in accordance with the present invention.

The present invention may be implemented in the form of one or more integrated circuits. For example, a given baseband processor or other type of processor configured to implement an adaptive peak windowing algorithm in accordance with the invention may be implemented as one or more integrated circuits. Numerous other configurations are possible.

In such an integrated circuit implementation, a plurality of identical die are typically formed in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

As noted previously, the present invention may also be implemented at least in part in the form of one or more software programs that, within a given base station transmitter, are stored in a memory and run on a processor. Such processor and memory elements may comprise one or more integrated circuits.

Again, it should be emphasized that the embodiments of the invention as described herein are intended to be illustrative only.

For example, the particular adaptive peak windowing algorithm of the illustrative embodiment may be modified to accommodate other crest factor reduction applications, in base station transmitters or other communication system applications. Also, the particular arrangements of transmitter and processing elements as shown in the figures may be varied in alternative embodiments. These and numerous other alternative embodiments within the scope of the following claims will be readily apparent to those skilled in the art.

What is claimed is:

1. An apparatus for use in a communication system transmitter, the apparatus comprising:
    a baseband processor having an output configured for coupling via an upconverter to an input of a power amplifier of the transmitter;
    the baseband processor comprising a crest factor reduction element implementing an adaptive peak windowing algorithm for application to an input signal, the adaptive peak windowing algorithm comprising a windowing function that is adaptively adjustable for reducing interference among different peaks of the input signal;
    wherein, after a complete peak pulse of the input signal is observed in a current window, a corresponding sequence of samples is saved as a first vector;
    wherein the first vector is processed to generate a second vector which corresponds to the first vector prefixed and suffixed with one or more values, the prefixing and suffixing being based at least in part on the length of the first vector and the length of the current window; and
    wherein the windowing function is adaptively adjustable based at least in part on the second vector.

2. The apparatus of claim 1 wherein the adaptive peak windowing algorithm multiplies the input signal with the following function, which comprises a predefined windowing function w(n):

$$b(n) = 1 - \sum_{k=-\infty}^{\infty} \delta \cdot [1 - c'(k)]w(n-k),$$

where δ denotes a scaling factor and c'(k) denotes a modification of a kth clipping factor c(k) of the input signal.

3. The apparatus of claim 2 wherein the scaling factor δ changes adaptively based on information associated with one or more peaks of the input signal observed within the current window.

4. The apparatus of claim 2 wherein the modified clipping factor c'(k) changes adaptively based on information associated with one or more peaks of the input signal observed within the current window.

5. The apparatus of claim 1 wherein the adaptive peak windowing algorithm comprises an initialization phase wherein an initial window is determined, prior to arrival of a first peak of the input signal, utilizing a predetermined value of a scaling factor of the windowing function.

6. The apparatus of claim 5 wherein the predetermined value is approximately one.

7. The apparatus of claim 5 wherein in conjunction with arrival of the first peak in the input signal, the adaptive peak windowing algorithm updates the scaling factor and utilizes the updated scaling factor to scale the windowing function.

8. The apparatus of claim 7 wherein if a given peak does not end, the corresponding scaling factor continues to be applied in calculating b(n).

9. The apparatus of claim 8 wherein once the given peak ends and in conjunction with arrival of a complete new peak, the adaptive peak windowing algorithm again updates the scaling factor and utilizes the updated scaling factor to scale the windowing function.

10. The apparatus of claim 1 wherein the crest factor reduction element is implemented at least in part in software running on the baseband processor.

11. The apparatus of claim 1 wherein the baseband processor further comprises a multi-carrier combining element and a digital pre-distortion element, and the crest factor reduction element is coupled between an output of the multi-carrier combining element and an input of the pre-distortion element.

12. The apparatus of claim 1 wherein the baseband processor is implemented in the form of an integrated circuit.

13. An apparatus for use in a communication system transmitter, the apparatus comprising:
a baseband processor having an output configured for coupling via an upconverter to an input of a power amplifier of the transmitter;
the baseband processor comprising a crest factor reduction element implementing an adaptive peak windowing algorithm for application to an input signal, the adaptive peak windowing algorithm comprising a function that is adaptively adjustable for reducing interference among different peaks of the input signal;
wherein the adaptive peak windowing algorithm multiplies the input signal with the following function, which comprises a predefined windowing function w(n):

$$b(n) = 1 - \sum_{k=-\infty}^{\infty} \delta \cdot [1 - c'(k)] w(n-k),$$

where δ denotes a scaling factor and c'(k) denotes a modification of a kth clipping factor c(k) of the input signal;
wherein the scaling factor δ changes adaptively based on information associated with one or more peaks of the input signal observed within a current window; and
wherein after a complete peak pulse of the input signal is observed in the current window, a corresponding sequence of c(k) samples is saved as a vector P, where P is processed to generate a vector $\tilde{C}$ which corresponds to the vector P prefixed and suffixed with 1 values until its length is the same as the length of the current window and a minimum value of P is positioned in the center of the current window.

14. The apparatus of claim 13 wherein the vectors P and $\tilde{C}$ are utilized to update the scaling factor δ.

15. The apparatus of claim 14 wherein the scaling factor δ is updated using the following equation:

$$\delta = \frac{1 - \min(P)}{(1 - \tilde{C}) * W^T}.$$

16. An apparatus for use in a communication system transmitter, the apparatus comprising:
a baseband processor having an output configured for coupling via an up converter to an input of a power amplifier of the transmitter;
the baseband processor comprising a crest factor reduction element implementing an adaptive peak windowing algorithm for application to an input signal, the adaptive peak windowing algorithm comprising a function that is adaptively adjustable for reducing interference among different peaks of the input signal;
wherein the adaptive peak windowing algorithm multiplies the input signal with the following function, which comprises a predefined windowing function w(n):

$$b(n) = 1 - \sum_{k=-\infty}^{\infty} \delta \cdot [1 - c'(k)] w(n-k),$$

where δ denotes a scaling factor and c'(k) denotes a modification of a kth clipping factor c(k) of the input signal;
wherein the modified clipping factor c'(k) changes adaptively based on information associated with one or more peaks of the input signal observed within a current window; and
wherein after a complete peak pulse of the input signal is observed in the current window, a corresponding sequence of c(k) samples is saved as a vector P, and the modified clipping factor c'(k) is determined as an entry of a vector C' which corresponds to the vector P prefixed with 1 values and suffixed with a single 1 value until its length is the same as the length of the current window.

17. The apparatus of claim 16 wherein the vector C' is prefixed and suffixed with 1 values in order to eliminate effects of one or more other peaks positioned in the same window.

18. The apparatus of claim 16 wherein the vector C' is utilized in computing a new function b(n).

19. An integrated circuit for use in a communication system transmitter, the integrated circuit implementing at least a portion of a baseband processor of the transmitter, the portion of the baseband processor implemented by the integrated circuit comprising a crest factor reduction element implementing an adaptive peak windowing algorithm for application to an input signal, the adaptive peak windowing algorithm comprising a windowing function that is adaptively adjustable for reducing interference among different peaks of the input signal, wherein, after a complete peak pulse of the input signal is observed in a current window, a corresponding sequence of samples is saved as a first vector; wherein the first vector is processed to generate a second vector which corresponds to the first vector prefixed and suffixed with one or more values, the prefixing and suffixing being based at least in part on the length of the first vector and the length of the current window; and wherein the windowing function is adaptively adjustable based at least in part on the second vector.

20. A communication system transmitter comprising:
a baseband processor;
an upconverter for upconverting an output signal from the baseband processor; and
a power amplifier having an input coupled to an output of the upconverter;
the baseband processor comprising a crest factor reduction element implementing an adaptive peak windowing algorithm for application to an input signal, the adaptive peak windowing algorithm comprising a windowing function that is adaptively adjustable for reducing interference among different peaks of the input signal;
wherein, after a complete peak pulse of the input signal is observed in a current window, a corresponding sequence of samples is saved as a first vector;
wherein the first vector is processed to generate a second vector which corresponds to the first vector prefixed and suffixed with one or more values, the prefixing and suffixing being based at least in part on the length of the first vector and the length of the current window; and
wherein the windowing function is adaptively adjustable based at least in part on the second vector.

* * * * *